M. Grover.
Nut Fastener.

Nº 94,885. Patented Sept. 14, 1869.

Witnesses;
J. C. Johnson
Geo. W. Beey

Inventor;
Manasseh Grover

United States Patent Office.

MANASSEH GROVER, OF CLYDE, OHIO.

Letters Patent No. 94,885, dated September 14, 1869.

---

IMPROVEMENT IN NUT-FASTENER.

---

The Schedule referred to in these Letters Patent and making part of the same.

---

*To all whom it may concern:*

Be it known that I, MANASSEH GROVER, of Clyde, in the county of Sandusky, and State of Ohio, have invented a new and useful improved mode of constructing what I denominate a "Nut-Fastener," to use or be used on reapers and mowers, and on all other machines to which it may be adapted, in such a mode as to prevent the nuts when screwed tight on to the said nut-fastener from becoming loose by turning, or rotating backward, or in a direction to become loose, (only by pressure when desired;) and I do hereby declare that the following is a full, clear, and exact description of the construction and operation of the same, reference being had to the accompanying drawings, and to the letters of reference marked thereon, making a part of the specification, in which—

The nature of my invention consists in a new and improved mode of constructing what I denominate a "nut-fastener," to use or be used on reapers and mowers, and on all other machines to which it may be adapted, in such a mode as to prevent the nuts when screwed tight on to the said nut-fastener from becoming loose by turning or rotating backward or in a direction to become loose, (only by pressure when desired.)

To enable others skilled in the art to make and use my invention, I will proceed to describe its construction and operation.

D, as seen in the accompanying drawings, is the main bar to the machine, exhibiting the construction and operation of the nut-fastener A.

S is the bolt, by which means the nut N is screwed tight on to the nut-fastener A.

The corners C C of the said nut-fasteners are curved off from the bar D, in order that the nut N cannot turn or rotate backward, thereby becoming loose without the corners C C of the nut-fastener A being pressed sufficiently toward the bar D, which is done by turning or rotating the nut N, which presses its corners against the corners C C of the said nut-fastener, and forces them toward the bar D, as the corners of the nut N come in contact with the said corners C C when pressed forward or backward.

Figure 1:
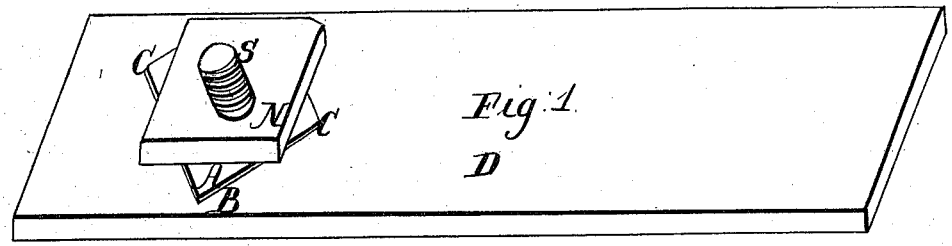
Figure 1 is a perspective view of the machine, exhibiting the construction and operation of the said nut-fastener.
Figure 2:
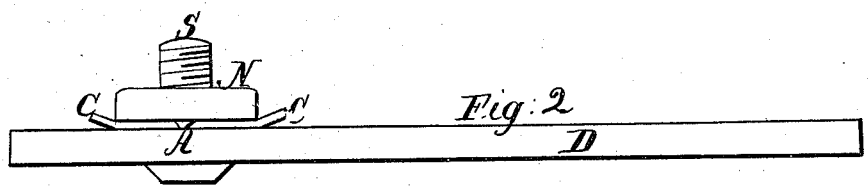
Figure 2 is a longitudinal elevation of the same.

Said nut-fastener is constructed of spring steel, or any other suitable material, and immediately after the corners of the said nut N pass over the corners C C of the nut-fastener A, the said corners C C of the said nut-fastener spring back to their proper position, as seen at C C, fig. 2.

Figure 3:
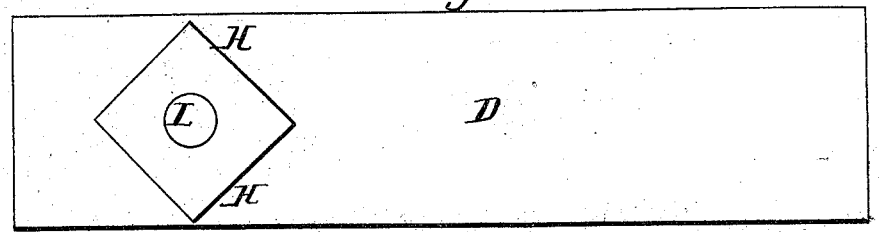
Figure 3 is a detached top view of the bar of the same.
Figure 4:
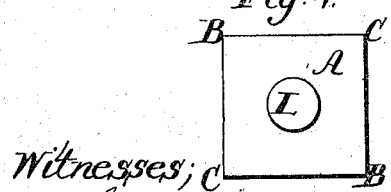
Figure 4 is a detached top view of the nut-fastener.

B B are the two corners of the said nut-fastener, curved toward the bar D, and placed into the indentations at H H, fig. 3, for the purpose of preventing the nut-fastener A from turning or rotating by pressure when forcing the nut N either forward or backward.

Figure 5:
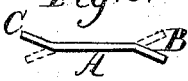
Figure 5 is an end view of the same.
Figure 6:
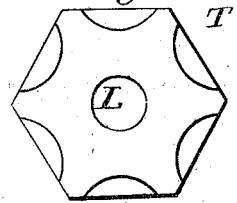
Figure 6 is a six-square nut, hereinafter described.

C B, fig. 5, represent an end view of the nut-fastener A.

L represents the bolt-holes for bolt S.

Nut T is represented with its face upward, in order to represent the six sides of the face as being each side between the corners concaved a little toward the bolt-hole L, for the purpose of admitting the corners C C of the said nut-fastener to spring into. To prevent the said nut from turning forward or backward only when desired, the nut-fastener A may have the side that is in contact with the bar D furrowed or cut similar to a file, in order to prevent it from turning with nut N, when it may become necessary to use it in places that cannot have indentations made as at H H.

What I claim as my invention, and desire to secure by Letters Patent, is—

1. The nut-fastener A, arranged and operating substantially for the purpose hereinbefore set forth.

2. The nut T, or its equivalent, arranged and operating substantially for the purpose hereinbefore set forth.

MANASSEH GROVER.

Witnesses:
E. D. BENNER,
ENOS GROVER.